July 2, 1946.   J. E. ERICKSON   2,403,271
HARVESTER
Filed Dec. 20, 1943
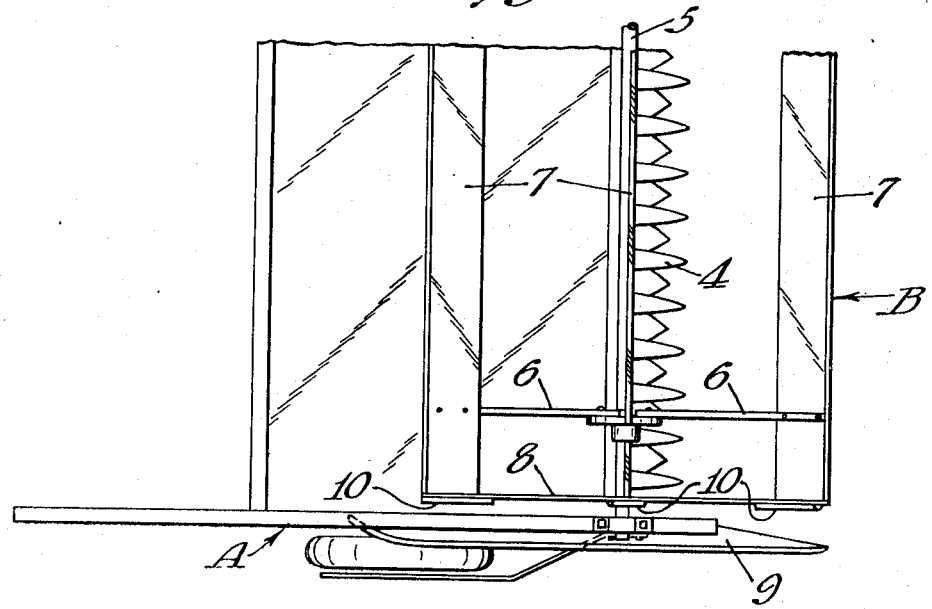
Fig. 1
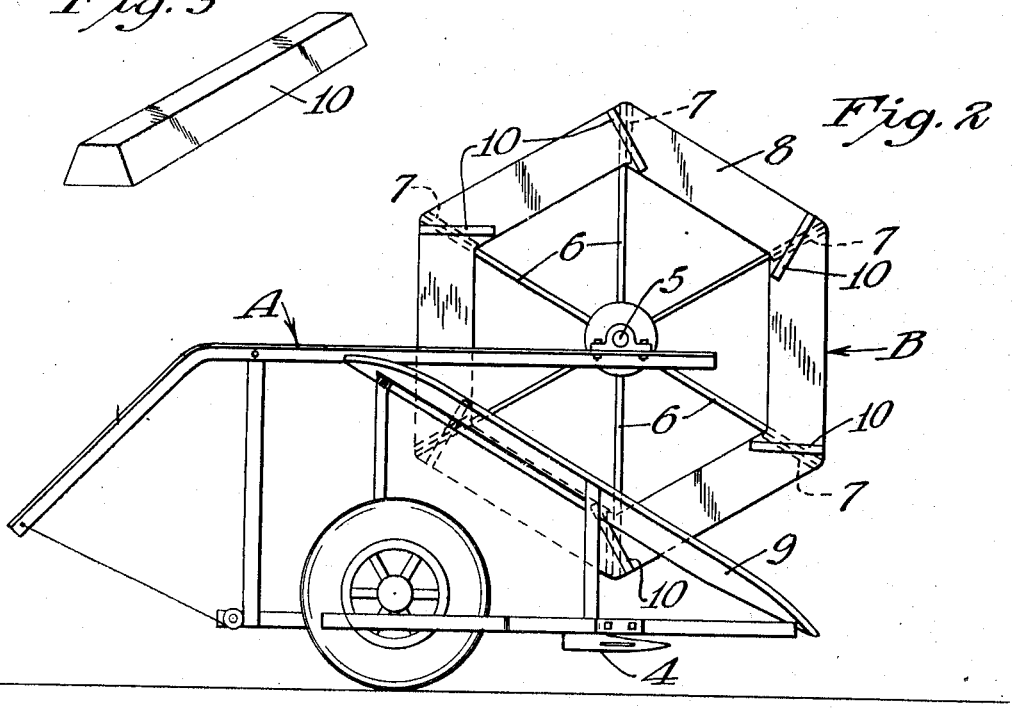
Fig. 3
Fig. 2
Inventor
John E. Erickson
By Williamson & Williamson
Attorneys Patented July 2, 1946

2,403,271

UNITED STATES PATENT OFFICE 2,403,271

HARVESTER

John E. Erickson, East Grand Forks, Minn.

Application December 20, 1943, Serial No. 514,898

3 Claims. (Cl. 56—220)

This invention relates to crop harvesters and more particularly to machines such as swathers, binders, combines and the like.

In my prior Patent Number 2,092,643. issued September 7, 1937, for a Reel for harvester, there is disclosed a reel having a plurality of radially disposed spaced slats or sweeps whose adjacent ends are connected by a substantially continuous member which is adapted to prevent stalks from falling endwise between the slats so that the stalks will not become tangled.

It is an object of the present invention to provide a harvester including a reel having end fenders as disclosed in said prior patent with the addition of means for preventing stalks from accumulating between the reel fenders and closely adjacent portions of the harvester frame as well as the conventional moldboard or crop divider with which such machines are usually equipped.

More specifically it is an object of my invention to provide devices which can be readily attached to reels having fenders of the type described either during or after manufacture.

These and other objects and advantages of the invention will more fully appear from the following description made in connection with the accompanying drawing, wherein like reference characters refer to the same parts throughout the views, and, in which:

Fig. 1 is a fragmentary plan view of a portion of a harvester including the sickle bar reel and crop divider;

Fig. 2 is an end elevation of the harvester; and

Fig. 3 is a perspective view of one of the stalk clearing elements.

In Figs. 1 and 2 there is shown a frame A upon which is mounted a sickle bar 4. On the upper forward portion of the frame A is a shaft 5 rotatably supporting a reel generally designated at B. The reel includes radial spokes 6 having slats or sweeps 7 supported thereby, and, as is readily understood in the art, the reel is adapted to rotate in a clockwise direction as viewed in Fig. 2 to engage the crop stalks and hold them in proper position to be cut by the sickle bar 4.

Connecting the ends of the slats or sweeps 7 is a fender 8 which forms a relatively continuous smooth member preventing the stalks from falling endwise between said sweeps 7 and entangling the crop. The fender 8 is disclosed and claimed in my above identified prior patent.

Mounted upon the harvester frame A is a moldboard or crop divider 9 which slants downwardly and forwardly closely adjacent the end of the reel B and its crop fender 8. Secured to the crop fender 8 is a plurality of stalk clearing elements 10 which, as best shown in Fig. 1, extend outwardly from said crop fender 8 between the fender and portions of the frame A and the moldboard or crop divider 9.

While my reel fender 8 has proven to be very satisfactory in preventing stalks from falling inwardly between the ends of the reel sweeps 7 it has been found that there is a tendency for stalks to accumulate between the reel fender 8 and adjacent portions of the frame A and also the moldboard or divider 9. This is due to the relatively smooth unbroken connection of the crop fender 8 and clearing of the clogged stalks from between the fender and the moldboard has been found necessary. However, by providing the cleats or stalk clearing elements 10 it has been found that they will engage the stalks between the fender 8 and the moldboard 9 and keep the space between these elements free and unclogged.

The stalk clearing elements or cleats 10 can be made of any suitable material but I have found that one efficient type of cleat can be formed from short sections of an ordinary V belt, and while the particular angle of the cleat relative to the radius of the reel is not essential it has been found that placing the cleats at the angles shown in Fig 2 has been satisfactory.

It will, of course, be understood that various changes may be made in the form, arrangement, details and proportions of the various parts without departing from the scope of my invention.

What is claimed is:

1. In a harvester and the like, a cutter, a reel mounted for rotation above said cutter, said reel having a relatively continuous smooth outer end portion constituting a crop fender, said harvester including a relatively stationary portion in closely spaced relation to said smooth crop fender, and stalk clearing means supported by said reel between said smooth crop fender and said stationary harvester portion.

2. In a harvester and the like, a cutter, a reel mounted for rotation above said cutter, said reel having a relatively continuous smooth outer end portion constituting a crop fender, a relatively stationary crop divider positioned in closely spaced relation to said smooth end of said reel, and stalk clearing means supported by said reel between said smooth crop fender and said crop divider.

3. In a harvester and the like, a cutter, a reel mounted for rotation above said cutter, said reel including a plurality of radially disposed spaced sweeps, a crop fender extending between the ends of said sweeps, said fender having a substantially unbroken flat surface in a plane normal to the axis of said reel, said harvester including a relatively stationary portion in closely spaced relation to said fender, and stalk clearing means supported by said reel between said fender and said stationary harvester portion.

JOHN E. ERICKSON.